(No Model.)
C. J. CLARKE.
TIRE FOR VEHICLE WHEELS.
No. 293,630. Patented Feb. 19, 1884.
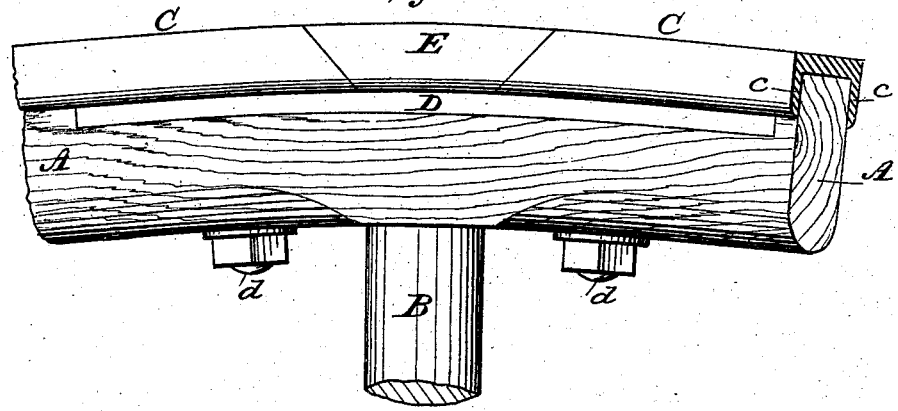
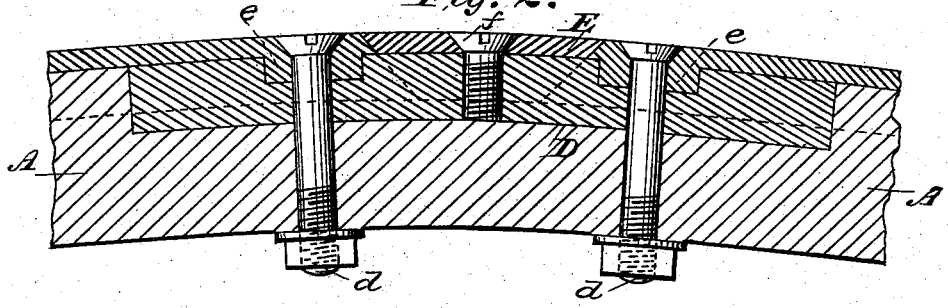
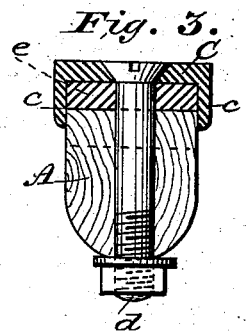
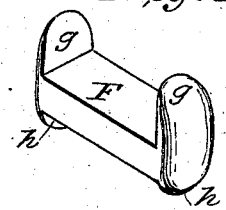
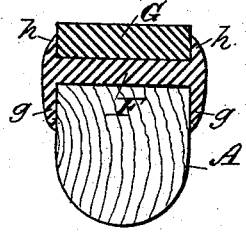
Witnesses:
M. Lindon
S. F. Landes.
Inventor:
Charles J. Clarke,
By J. C. Brecht,
Attorney.

UNITED STATES PATENT OFFICE.

CHARLES JACKSON CLARKE, OF MOUNT CRAWFORD, VIRGINIA.

TIRE FOR VEHICLE-WHEELS.

SPECIFICATION forming part of Letters Patent No. 293,630, dated February 19, 1884.

Application filed August 15, 1883. (No model.)

*To all whom it may concern:*

Be it known that I, CHARLES J. CLARKE, a citizen of the United States, residing at Mount Crawford, in the county of Rockingham and State of Virginia, have invented certain new and useful Improvements in Wheels for Vehicles; and I do hereby declare the following to be a full, clear, and exact description of the invention, such as will enable others skilled in the art to which it appertains to make and use the same.

My invention relates to improvements in the construction of wheels for vehicles; and the object is to produce a felly-protector and tire-retainer that is simple in construction; that will protect the fellies from wear and injury on the sides, and by which the tire is prevented from leaving its place on the wheel. Another object is to use a thinner tire than has ordinarily been done; also, that the tire can be adjusted to suit the different variations in the circumference common in the sizes of wheels; that the tire requires no heating after being made, but can be applied in a cold state, and that it is superior in strength and durability.

The invention consists in the construction and arrangement of parts, as will be more fully described hereinafter, and specifically pointed out in the claims, reference being had to the accompanying drawings and the letters of reference marked thereon.

In the accompanying drawings, Figure 1 represents a side elevation of my device in position on a felly. Fig. 2 is a longitudinal section of the same. Fig. 3 is a cross-section on line $x\ x$. Fig. 4 is a modified form of tire-retainer. Fig. 5 is a section of the same in place on a felly.

In the accompanying drawings, A represents the felly, and B is a spoke secured in the ordinary manner. The felly-protector C, which forms the tire, is provided on each side with a flange, $c$, which fits snugly over the sides of the wheel. At the point where the tire or felly-protector is to be joined together the felly is recessed to receive a separate piece, D, and this in turn is recessed for the reception of the lugs $e$ on the protector C, to prevent any end-play of said protector. The two ends of the protector C are beveled, and between them is fitted the central piece, E, which is preferably arranged over one of the spokes of the wheel. A screw, $f$, securely holds this piece E in position, and the protector is thus clamped in place. The ends of the protector C are held in their position by the bolts $d$, which pass through the piece E and the felly A. The screw $f$ is tapped into the piece E, and is arranged, preferably, so as to come over the spoke.

As a modification of the above described, I may in some instances employ a tire-retainer, as shown in Figs. 4 and 5. In this instance a central web, F, is provided with lugs or projections $g$ and $h$. The tire G is retained between the lugs $h$, and the lugs $g$ fit snugly over the sides of the fellies. A recess is cut into the face of the felly to receive the web F and hold it in place. These retainers are also preferably arranged over the place where the spokes enter into the fellies; but they do not possess the advantages of the first-described arrangement.

It will be readily seen that by my felly-protector the tire can be made much lighter than ordinarily, as the flanges make it sufficiently rigid, while at the same time protecting the sides of the fellies from wear or injury.

The tire can be adjusted to suit different sizes of wheels. No heating of the tire is required, as it can be applied in a cold state. It cannot leave its place on the wheel, as the flanges prevent this, and it is superior in strength and durability in proportion to the quantity of metal employed.

Having thus described my invention, what I claim, and desire to secure by Letters Patent, is—

1. A felly-protector consisting of a flanged bisected ring, C, and detachable piece D, in combination with the central piece, E, secured in place by a screw, $f$, substantially as shown and set forth.

2. A felly-protector consisting of a flanged bisected ring, C, and detachable piece D, provided with recesses for the lugs $e$, in combination with a central piece, E, secured in place by a screw, $f$, substantially as specified.

3. A felly-protector consisting of a flanged bisected ring, C, and detachable piece D, provided with recesses for reception of the lugs $e$ on said ring, in combination with the central beveled piece, E, screw $f$, and the bolts $d$, all constructed substantially as specified.

In testimony whereof I hereby affix my signature in presence of two witnesses.

CHARLES JACKSON CLARKE.

Witnesses:
M. LINDON,
S. F. LANDES.